United States Patent
Zhao et al.

(10) Patent No.: US 10,082,210 B2
(45) Date of Patent: Sep. 25, 2018

(54) BUTTERFLY VALVE, STERILE POWDER CONVEYING DEVICE COMPOSED OF MULTIPLE BUTTERFLY VALVES AND ITS METHOD OF USE

(71) Applicant: ZHEJIANG MEDICINE CO., LTD. XINCHANG PHARMACEUTICAL FACTORY, Xinchang, Zhejiang (CN)

(72) Inventors: Junxing Zhao, Zhejiang (CN); Xiaoyong Wang, Zhejiang (CN)

(73) Assignee: ZHEJIANG MEDICINE CO., LTD. XINCHANG PHARMACEUTICAL FACTORY, Zhejiang (CN)

( * ) Notice: Subject to any disclaimer, the term of this patent is extended or adjusted under 35 U.S.C. 154(b) by 0 days.

(21) Appl. No.: 15/535,011

(22) PCT Filed: Dec. 11, 2015

(86) PCT No.: PCT/CN2015/097078
§ 371 (c)(1),
(2) Date: Jun. 9, 2017

(87) PCT Pub. No.: WO2016/091204
PCT Pub. Date: Jun. 16, 2016

(65) Prior Publication Data
US 2017/0328476 A1    Nov. 16, 2017

(30) Foreign Application Priority Data

Dec. 11, 2014    (CN) .......................... 2014 1 0763540

(51) Int. Cl.
*F16K 1/22* (2006.01)
*F16K 15/03* (2006.01)

(52) U.S. Cl.
CPC .............. *F16K 1/22* (2013.01); *F16K 15/03* (2013.01); *F16K 15/035* (2013.01)

(58) Field of Classification Search
CPC ........... F16K 1/22; F16K 15/03; F16K 15/035
See application file for complete search history.

(56) References Cited

U.S. PATENT DOCUMENTS 4,190,074 A  *  2/1980  Mailliet et al. ......... C21B 7/005
                                                137/315.16
5,046,686 A  *  9/1991  Carla et al. ............ B64D 13/02
                                                      137/527

(Continued)

FOREIGN PATENT DOCUMENTS

CN        201553484 U     8/2010
CN        201660307 U    12/2010

(Continued)

*Primary Examiner* — Kevin Lee
(74) *Attorney, Agent, or Firm* — Muncy, Geissler, Olds & Lowe, P.C.

(57) ABSTRACT

A butterfly valve includes a valve body and valve clack in the valve body. The valve body is installed with at least one sprinkler connected to an inlet valve outside the valve body for purging the inner surface of butterfly valve In the middle of the valve clack is a horizontal drainage tray, one end of which is closed and the other is water outlet, and the valve clack is equipped with at least one drain hole connected to the drainage tray; the sprinkler is above the drainage tray. This invention can be filled with corresponding media for online cleaning, sterilization and drying of non-sterile areas of a butterfly valve group after conveying the powder to realize repeated butt-joints.

18 Claims, 2 Drawing Sheets

(56) References Cited

U.S. PATENT DOCUMENTS

Figure 1:
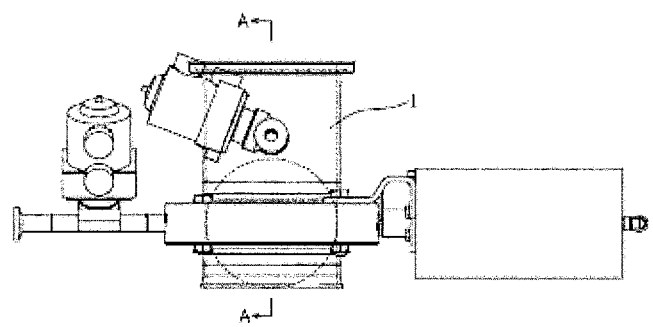
Figure 2:
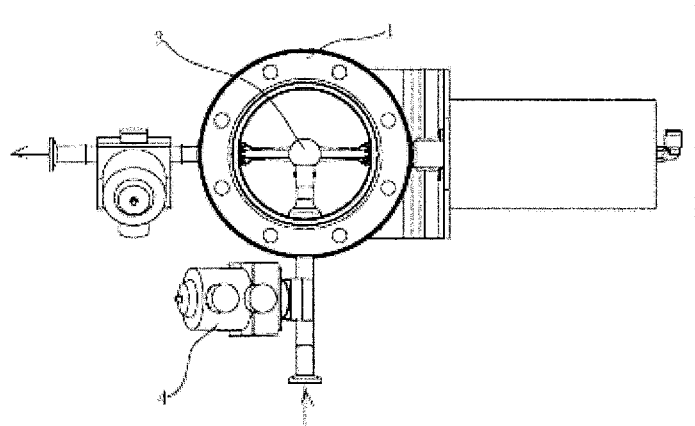
Figure 3:
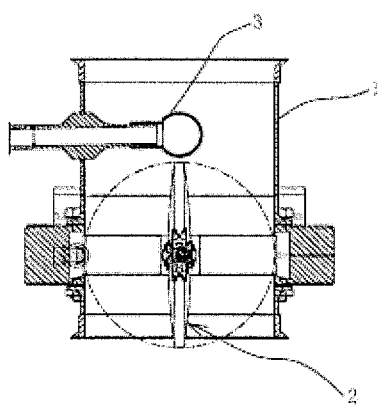
Figure 4:
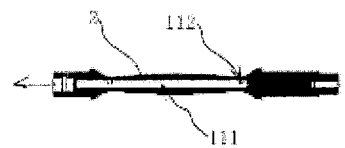
Figure 5:
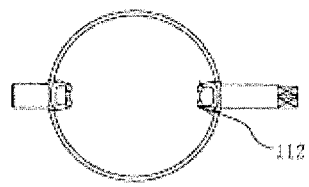
Figure 6:
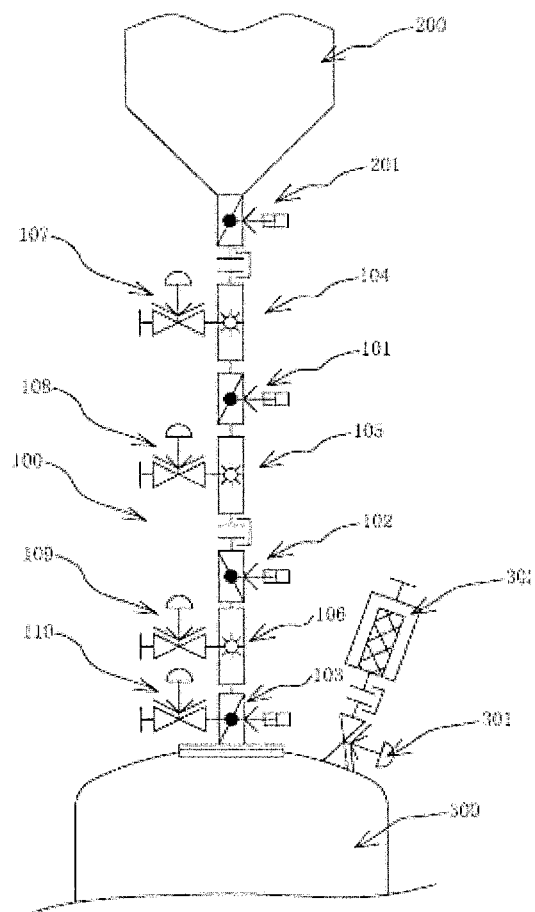

| | | | |
|---|---|---|---|
| 8,740,176 B2* | 6/2014 | Zeng | F16K 31/1225 |
| | | | 137/219 |
| 2016/0040664 A1* | 2/2016 | Zhang | F04B 39/1073 |
| | | | 417/473 |

FOREIGN PATENT DOCUMENTS

| | | |
|---|---|---|
| CN | 103671969 A | 3/2014 |
| CN | 204297690 U | 4/2015 |
| DE | 202013104058 U1 | 11/2013 |
| FR | 2585800 B1 | 6/1990 |
| JP | 2011027220 A | 2/2011 |

* cited by examiner

BUTTERFLY VALVE, STERILE POWDER CONVEYING DEVICE COMPOSED OF MULTIPLE BUTTERFLY VALVES AND ITS METHOD OF USE

TECHNICAL FIELD

This invention involves powder conveying field, specifically a butterfly valve, a sterile powder conveying device composed of multiple butterfly valves and its method of use for powder loading and unloading in pharmacy, biology, food and other industries.

BACKGROUND TECHNOLOGY

At present, it needs to convey materials from a sterile space to another and maintain the sterile state in the process in non-sterile production environment of products in pharmacy, biology, food and other industries. Technical difficulty is huge in the event of sterile transfer of a great number (>10 kg) of sterile powder materials in a non-sterile environment.

Powder residue will be left on the inner surface of butterfly valve, including valve clack and seal ring, after powder conveying. The powder residue will disable sealing of butterfly valve to contaminate the sterile materials due to exposure to non-sterile environment. Meanwhile, the powder will leak into the environment, particularly some sensitive materials, to have negative influence on the environment and operating personnel. In addition, the cleaning media will leak into the materials during online cleaning to contaminate the sterility of materials to be transferred and receiving containers.

The technology widely used in the world is split butterfly valve technology, but it has some defects: a) powder residue will be left on the inner surface of butterfly valve after powder conveying to damage air-tightness of butterfly valve and sterility of products; b) the powder residue causes wear of sealing gasket of butterfly valve to leak fine particles, which entails frequency replacement of sealing gasket; c) online cleaning and sterilization between two split valve clacks is impossible due to unreliable sealing; d) VHP disinfection technology fails to strictly guarantee sterility; e) leakage is possible during VHP disinfection, bringing risk to health of production personnel. The sterility guarantee of this technology is insufficient as air-tightness can not be guaranteed.

CONTENT OF INVENTION

The technical problem solved by this invention is to overcome defects of above existing technology, and provide a butterfly valve for purging powder residue to guarantee effective air-tightness of the butterfly valve.

To this end, the following technical scheme is adopted in this invention: the butterfly valve consists of valve body and valve clack in the valve body. Its characteristic is that the valve body is installed with at least one sprinkler connected to an inlet valve outside the valve body for purging the inner surface of butterfly valve; in the middle of the valve clack is a horizontal drainage tray, one end of which is closed and the other is water outlet, and the valve clack is equipped with at least one drain hole connected to the drainage tray; the sprinkler is above the drainage tray.

Furthermore, the upper surface of valve clack is a concave cambered surface, which tends to store water, and the drain hole is at the bottom.

This invention can inject sterile gas at appropriate pressure after powder conveying to purge the inner surface of butterfly valve to remove the powder residue and guarantee complete sealing between butterfly valve clack and sealing gasket. The butterfly valve can be manual or automatic, and sanitary stainless steel butterfly valve is used.

Another purpose of this invention is to provide a sterile powder conveying device composed of multiple above butterfly valves, which is capable of online cleaning, sterilization and drying for the butterfly valve and purging powder residue in the butterfly valve to guarantee sterility of materials during conveying.

The technical scheme used for another purpose of this invention is as follows: the sterile powder conveying device composed of multiple above butterfly valves is equipped with a butterfly valve group with multiple butterfly valves. Its characteristic is that the water outlet of drainage tray of the butterfly valve at the bottom of butterfly valve group is connected to a drain valve outside the butterfly valve; it also includes upstream sterile equipment and downstream sterile receiving container, between which is the butterfly valve group, the lower end of the butterfly valve at the bottom of butterfly valve group is connected to feeding hole of downstream sterile receiving container, and discharge hole of upstream sterile equipment is connected to an upstream butterfly valve that is connected to the butterfly valve on the top of the butterfly valve group.

Corresponding media can be injected for online cleaning, sterilization and drying of non-sterile areas of butterfly valve group as the butterfly valve can be completely sealed to realize repeated butt-joint without affecting the sterility of materials conveyed and downstream sterile receiving container.

Moreover, the downstream sterile receiving container is installed with a respirator, and a respirator valve is set between them for control of the respirator.

In addition, the adjacent butterfly valves are connected by flange, welding or quick clamp, which is selected in light of practical situation.

Furthermore, the sprinkler is a 360° spray ball or nozzle, which can realize 360° spray. The sprinkler can be fixed or rotary, which is selected on the basis of practical situation. The position of sprinkler on the butterfly valve can be changed as needed.

The third purpose of this invention is to provide method of use of the above sterile powder conveying device. The butterfly valve group is connected with butterfly valve 1, butterfly valve 2 and butterfly valve 3 in series from top to bottom. The steps are as follows:

a. The discharge hole of upstream sterile equipment is connected to upstream butterfly valve, which is connected to butterfly valve 1 with flanges or clamps, and then they undergo online cleaning, sterilization and drying together;

b. The feeding hole of downstream sterile receiving container is connected to butterfly valve 3 and butterfly valve 2 connected in series, and then they undergo online cleaning, sterilization and drying together;

c. Move downstream sterile receiving container to below upstream sterile equipment, lift downstream sterile receiving container with lifting equipment and accurately connect it to butterfly valve 1, and connect butterfly valve 1 and butterfly valve 2 with clamps in an airtight way to complete connection of sterile conveying device;

d. Open butterfly valve 2, drain valve and inlet valves, inject cleaning fluid into the non-sterile area between butterfly valve 1 and butterfly valve 3 through sprinklers of butterfly valve 2 and butterfly valve 3 for online cleaning, then inject clean steam for online sterilization, finally inject sterile gas for online drying, and close all valves after operation is finished;

e. Open all butterfly valves after online cleaning, sterilization and drying in step d is completed, and open respirator valve of downstream sterile receiving container to convey sterile powder from upstream sterile equipment to downstream sterile receiving container; select appropriate size of butterfly valve in light of flowability of powder;

f. Close upstream butterfly valve, open inlet valves, inject sterile gas through sprinklers of butterfly valve 1, butterfly valve 2 and butterfly valve 3 to purge inner surface of butterfly valve to remove the powder residue after powder conveying; the sterile gas should pass through sterile filtration system before entering the butterfly valve;

g. Close butterfly valve 1, butterfly valve 2 and butterfly valve 3 after purging, inject sterile gas from respirator of downstream sterile receiving container for blowback of filter element of respirator, and pressurize downstream sterile receiving container to keep positive pressure in it; the sterile gas should pass through sterile filtration system before entering the butterfly valve;

h. Close respirator valve, and open the clamps to remove downstream sterile receiving container to finish the whole sterile powder conveying.

Moreover, the method and duration of purging in step f is determined through verification on the basis of flowability of the product, and intermittent pulsating purging or sectional purging is used.

Furthermore, the sterile gas is compressed air or inert gas, which is selected according to product properties.

The beneficial effect of this invention: 1) complete butterfly valve is used for good air-tightness; 2) powder residue on the inner surface of butterfly valve can be purged after use to guarantee air-tightness; 3) online cleaning, sterilization and drying can be conducted for non-sterile areas between butterfly valves to reliably guarantee sterility; 4) repeated sterile conveying can be achieved by conducting online cleaning, sterilization and drying once to realize high efficiency.

BRIEF DESCRIPTION OF THE DRAWINGS

FIG. 1 is structure diagram of butterfly valve of this invention.

FIG. 2 is top view of FIG. 1.

FIG. 3 is A-A section view of FIG. 1.

FIG. 4 is structure diagram of butterfly valve clack of this invention.

FIG. 5 is top view of FIG. 4.

FIG. 6 is structure diagram of sterile powder conveying device of this invention.

In the figure, 1—valve body, 2—valve clack, 3—sprinkler, 4—inlet valve, 100—butterfly valve group, 101—butterfly valve 1, 102—butterfly valve 2, 103—butterfly valve 3, 104—sprinkler of butterfly valve 1, 105—sprinkler of butterfly valve 2, 106—sprinkler of butterfly valve 3, 107, 108 and 109—inlet valve, 110—drain valve, 111—drainage tray, 112—drain hole, 200—upstream sterile equipment, 201—upstream butterfly valve, 300—downstream sterile receiving container, 301—respirator valve, 302—respirator.

DESCRIPTION OF THE PREFERRED EMBODIMENT

This invention is further described below in line with specific implementation method.

As for the butterfly valve shown in FIGS. 1-5, valve body 1 is installed with a fixed 360° sprinkler 3 for purging inner surface of butterfly valve, connected to inlet valve 4 outside the valve body. In the middle of the valve clack 2 is a horizontal oblong drainage tray 111, one end of which is closed and the other is water outlet. The upper surface of valve clack is a concave cambered surface, which tends to store water, and at the bottom are 4 drain holes 112 connected to drainage tray 111; the sprinkler 3 is above the drainage tray 111.

The sterile powder conveying device shown in FIG. 6 is composed of butterfly valve group 100, upstream sterile equipment 200 and downstream sterile receiving container 300. Butterfly valve group 100 is between upstream sterile equipment 200 and downstream sterile receiving container 300. The lower end of the butterfly valve at the bottom of butterfly valve group is connected to feeding hole of downstream sterile receiving container 300, and discharge hole of upstream sterile equipment 200 is connected to upstream butterfly valve 201 that is connected to the butterfly valve on the top of the butterfly valve group. The butterfly valve group 100 is connected with butterfly valve 1 101, butterfly valve 2 102 and butterfly valve 3 103 in series from top to bottom. The water outlet of drainage tray of the butterfly valve 3 at the bottom of butterfly valve group is connected to a drain valve 110 outside the butterfly valve, and outfall of the drain valve is connected to drain valve and trap group. The downstream sterile receiving container 300 is installed with a respirator 302, and a respirator valve 301 is set between them for control of the respirator.

The method of use of above sterile powder conveying device is as follows:

a. The discharge hole of upstream sterile equipment 200 is connected to upstream butterfly valve 201, which is connected to butterfly valve 1 101 with flanges or clamps, and then they undergo online cleaning, sterilization and drying together;

b. The feeding hole of downstream sterile receiving container 300 is connected to butterfly valve 3 103 and butterfly valve 2 102 connected in series, and then they undergo online cleaning, sterilization and drying together;

c. Move downstream sterile receiving container 300 to below upstream sterile equipment 200, lift downstream sterile receiving container 300 with lifting equipment and accurately connect it to butterfly valve 1 101, and connect butterfly valve 1 101 and butterfly valve 2 102 with clamps in an airtight way to complete connection of sterile conveying device;

d. Open butterfly valve 2 102, drain valve 110 and inlet valves 108 and 109, inject cleaning fluid into the non-sterile area between butterfly valve 1 101 and butterfly valve 3 103 through sprinklers 105 and 106 of butterfly valve 2 and butterfly valve 3 for online cleaning, then inject clean steam for online sterilization, finally inject sterile gas for online drying, and close all valves after operation is finished;

e. Open all butterfly valves after online cleaning, sterilization and drying in step d is completed, and open respirator valve 301 of downstream sterile receiving container to convey sterile powder from upstream sterile equipment to downstream sterile receiving container; select appropriate size of butterfly valve in light of flowability of powder;

f. Close upstream butterfly valve 201, open inlet valves 107, 108 and 109, inject sterile gas through sprinklers 104, 105 and 106 of butterfly valve 1, butterfly valve 2 and butterfly valve 3 to purge inner surface of butterfly valve to remove the powder residue after powder conveying; the sterile gas should pass through sterile filtration system before entering the butterfly valve;

g. Close butterfly valve 1, butterfly valve 2 and butterfly valve 3 after purging, inject sterile gas from respirator 302 of downstream sterile receiving container 300 for blowback of filter element of respirator, and pressurize downstream sterile receiving container 300 to keep positive pressure in it; the sterile gas should pass through sterile filtration system before entering the butterfly valve;

h. Close respirator valve 301, and open the clamps to remove downstream sterile receiving container 300 to finish the whole sterile powder conveying.

Only good implementation of this invention is described above, but it can not be interpreted as restriction for claims. This invention is not limited to the above implementation, and its specific structure can change. Any changes within the protection scope of independent claims are within protection scope of this invention.

The invention claimed is:

1. A butterfly valve consisting of a valve body and a valve clack in the valve body, wherein the valve body is installed with at least one sprinkler connected to an inlet valve outside the valve body for purging an inner surface of the butterfly valve; in a middle of the valve clack is a horizontal drainage tray, one end of which is closed and the other is a water outlet, and the valve clack is equipped with at least one drain hole connected to the drainage tray and the sprinkler is above the drainage tray.

2. The butterfly valve according to claim 1, wherein an upper surface of the valve clack is a concave cambered surface, and the drain hole is at a bottom.

3. A sterile powder conveying device composed of a plurality of the butterfly valves according to claim 1, comprising:

a butterfly valve group with the plurality of butterfly valves, wherein the water outlet of the drainage tray of the butterfly valve at a bottom of the butterfly valve group is connected to a drain valve outside the butterfly valve; it also includes upstream sterile equipment and a downstream sterile receiving container, between which is the butterfly valve group, a lower end of the butterfly valve at the bottom of butterfly valve group is connected to a feeding hole of the downstream sterile receiving container, and a discharge hole of the upstream sterile equipment is connected to an upstream butterfly valve that is connected to the butterfly valve on a top of butterfly valve group.

4. The sterile powder conveying device according to claim 3, wherein the downstream sterile receiving container is installed with a respirator, and a respirator valve is set between them for control of the respirator.

5. The sterile powder conveying device according to claim 4, wherein the adjacent butterfly valves are connected by a flange, welding or a quick clamp.

6. The sterile powder conveying device according to claim 4, wherein the sprinkler is a 360° spray ball or nozzle.

7. A method of using the sterile powder conveying device according to claim 3, wherein the butterfly valve group is connected with a butterfly valve 1, a butterfly valve 2 and a butterfly valve 3 in series from the top to the bottom, the method comprising:

a. connecting the discharge hole of the upstream sterile equipment to the upstream butterfly valve, which is connected to the butterfly valve 1 with flanges or clamps, and then they undergo online cleaning, sterilization and drying together;

b. connecting the feeding hole of the downstream sterile receiving container to the butterfly valve 3 and the butterfly valve 2 in series, and then undergoing them through online cleaning, sterilization and drying together;

c. moving the downstream sterile receiving container to below the upstream sterile equipment, lifting the downstream sterile receiving container with lifting equipment and accurately connecting it to the butterfly valve 1, and connecting the butterfly valve 1 and the butterfly valve 2 with clamps in an airtight way to complete connection of the sterile conveying device;

d. opening the butterfly valve 2, the drain valve and the inlet valves, injecting cleaning fluid into a non-sterile area between the butterfly valve 1 and the butterfly valve 3 through the sprinklers of the butterfly valve 2 and the butterfly valve 3 for online cleaning, then injecting clean steam for online sterilization, finally injecting sterile gas for online drying, and close all valves after operation is finished;

e. opening all butterfly valves after the online cleaning, sterilization and drying in step d is completed, and opening a respirator valve of the downstream sterile receiving container to convey sterile powder from the upstream sterile equipment to the downstream sterile receiving container; selecting an appropriate size of the butterfly valve in light of flowability of powder;

f. closing the upstream butterfly valve, opening the inlet valves, injecting the sterile gas through the sprinklers of the butterfly valve 1, the butterfly valve 2 and the butterfly valve 3 to purge the inner surface of the butterfly valve to remove powder residue after powder conveying so that the sterile gas passes through a sterile filtration system before entering the butterfly valve;

g. closing the butterfly valve 1, the butterfly valve 2 and the butterfly valve 3 after purging, injecting the sterile gas from the respirator of the downstream sterile receiving container for blowback of a filter element of the respirator, and pressurizing the downstream sterile receiving container to keep a positive pressure in it so that the sterile gas passes through the sterile filtration system before entering the butterfly valve; and h. closing the respirator valve, and opening the clamps to remove the downstream sterile receiving container to finish the whole sterile powder conveying.

8. A method of using the sterile powder conveying device according to claim 4, wherein the butterfly valve group is connected with a butterfly valve 1, a butterfly valve 2 and a butterfly valve 3 in series from the top to the bottom, the method comprising:

a. connecting the discharge hole of the upstream sterile equipment is connected to the upstream butterfly valve, which is connected to the butterfly valve 1 with flanges or clamps, and then undergoing them through online cleaning, sterilization and drying together;

b. connecting the feeding hole of the downstream sterile receiving container to the butterfly valve 3 and the butterfly valve 2 in series, and then undergoing them through online cleaning, sterilization and drying together;

c. moving the downstream sterile receiving container to below the upstream sterile equipment, lifting the downstream sterile receiving container with lifting equipment and accurately connecting it to the butterfly valve 1, and connecting the butterfly valve 1 and the butterfly valve 2 with clamps in an airtight way to complete connection of the sterile conveying device;

d. opening the butterfly valve 2, the drain valve and the inlet valves, the inject cleaning fluid into a non-sterile area between the butterfly valve 1 and the butterfly valve 3 through the sprinklers of the butterfly valve 2 and the butterfly valve 3 for online cleaning, then injecting clean steam for online sterilization, finally injecting sterile gas for online drying, and closing all valves after operation is finished;

e. opening all butterfly valves after the online cleaning, sterilization and drying in step d is completed, and opening the respirator valve of the downstream sterile receiving container to convey sterile powder from the upstream sterile equipment to the downstream sterile receiving container; selecting an appropriate size of the butterfly valve in light of flowability of powder;

f. closing the upstream butterfly valve, opening the inlet valves, injecting the sterile gas through the sprinklers of the butterfly valve 1, the butterfly valve 2 and the butterfly valve 3 to purge the inner surface of butterfly valve to remove powder residue after powder conveying so that the sterile gas passes through sterile filtration system before entering the butterfly valve;

g. closing the butterfly valve 1, the butterfly valve 2 and the butterfly valve 3 after purging, injecting the sterile gas from the respirator of the downstream sterile receiving container for blowback of a filter element of the respirator, and pressurizing the downstream sterile receiving container to keep a positive pressure in it so that the sterile gas passes through the sterile filtration system before entering the butterfly valve; and h. closing the respirator valve, and opening the clamps to remove the downstream sterile receiving container to finish the whole sterile powder conveying.

9. A method of using the sterile powder conveying device according to claim 5, wherein the butterfly valve group is connected with a butterfly valve 1, a butterfly valve 2 and a butterfly valve 3 in series from the top to the bottom, the method comprising:

a. connecting the discharge hole of the upstream sterile equipment to the upstream butterfly valve, which is connected to the butterfly valve 1 with flanges or clamps, and then undergoing them through online cleaning, sterilization and drying together;

b. connecting the feeding hole of the downstream sterile receiving container is connected to the butterfly valve 3 and the butterfly valve 2 in series, and then undergoing them through online cleaning, sterilization and drying together;

c. moving the downstream sterile receiving container to below the upstream sterile equipment, lifting the downstream sterile receiving container with lifting equipment and accurately connecting it to the butterfly valve 1, and connecting the butterfly valve 1 and the butterfly valve 2 with clamps in an airtight way to complete connection of the sterile conveying device;

d. opening the butterfly valve 2, the drain valve and the inlet valves, injecting cleaning fluid into a non-sterile area between the butterfly valve 1 and the butterfly valve 3 through the sprinklers of the butterfly valve 2 and the butterfly valve 3 for online cleaning, then inject clean steam for online sterilization, finally injecting sterile gas for online drying, and close all valves after operation is finished;

e. opening all butterfly valves after the online cleaning, sterilization and drying in step d is completed, and opening a respirator valve of the downstream sterile receiving container to convey sterile powder from the upstream sterile equipment to the downstream sterile receiving container; selecting an appropriate size of butterfly valve in light of flowability of powder;

f. closing the upstream butterfly valve, opening the inlet valves, injecting the sterile gas through the sprinklers of the butterfly valve 1, the butterfly valve 2 and the butterfly valve 3 to purge the inner surface of the butterfly valve to remove powder residue after powder conveying so that the sterile gas passes through the sterile filtration system before entering the butterfly valve;

g. closing the butterfly valve 1, the butterfly valve 2 and the butterfly valve 3 after purging, injecting the sterile gas from a respirator of the downstream sterile receiving container for blowback of a filter element of the respirator, and pressurizing the downstream sterile receiving container to keep a positive pressure in it so that the sterile gas passes through the sterile filtration system before entering the butterfly valve; and h. closing the respirator valve, and opening the clamps to remove the downstream sterile receiving container to finish the whole sterile powder conveying.

10. A method of using the sterile powder conveying device according to claim 6, wherein the butterfly valve group is connected with a butterfly valve 1, a butterfly valve 2 and a butterfly valve 3 in series from the top to the bottom, the method comprising:

a. connecting the discharge hole of the upstream sterile equipment to the upstream butterfly valve, which is connected to the butterfly valve 1 with flanges or clamps, and then undergoing them through online cleaning, sterilization and drying together;

b. connecting the feeding hole of the downstream sterile receiving container to the butterfly valve 3 and the butterfly valve 2 in series, and then undergoing them through online cleaning, sterilization and drying together;

c. moving the downstream sterile receiving container to below the upstream sterile equipment, lifting the downstream sterile receiving container with lifting equipment and accurately connecting it to the butterfly valve 1, and connecting the butterfly valve 1 and the butterfly valve 2 with clamps in an airtight way to complete connection of sterile conveying device;

d. opening the butterfly valve 2, the drain valve and the inlet valves, injecting cleaning fluid into a non-sterile area between the butterfly valve 1 and the butterfly valve 3 through the sprinklers of the butterfly valve 2 and the butterfly valve 3 for online cleaning, then injecting clean steam for online sterilization, finally injecting sterile gas for online drying, and close all valves after operation is finished;

e. opening all butterfly valves after the online cleaning, sterilization and drying in step d is completed, and opening a respirator valve of the downstream sterile receiving container to convey sterile powder from the upstream sterile equipment to the downstream sterile receiving container; selecting an appropriate size of butterfly valve in light of flowability of powder;

f. closing the upstream butterfly valve, opening the inlet valves, injecting the sterile gas through the sprinklers of the butterfly valve 1, the butterfly valve 2 and the butterfly valve 3 to purge the inner surface of the butterfly valve to remove powder residue after powder conveying so that the sterile gas passes through a sterile filtration system before entering the butterfly valve;

g. closing the butterfly valve 1, the butterfly valve 2 and the butterfly valve 3 after purging, injecting the sterile gas from the respirator of the downstream sterile receiving container for blowback of a filter element of the respirator, and pressurizing the downstream sterile receiving container to keep a positive pressure in it so that the sterile gas passes through the sterile filtration system before entering the butterfly valve; and h. closing the respirator valve, and opening the clamps to remove the downstream sterile receiving container to finish the whole sterile powder conveying.

11. The method according to claim 7, wherein duration of purging in step f is determined through verification on the basis of the flowability of the product, and intermittent pulsating purging or sectional purging is used.

12. The method according to claim 8, wherein duration of purging in step f is determined through verification on the basis of the flowability of the product, and intermittent pulsating purging or sectional purging is used.

13. The method according to claim 9, wherein duration of purging in step f is determined through verification on the basis of the flowability of the product, and intermittent pulsating purging or sectional purging is used.

14. The method according to claim 10, wherein duration of purging in step f is determined through verification on the basis of the flowability of the product, and intermittent pulsating purging or sectional purging is used.

15. The method according to claim 7, wherein the sterile gas is compressed air or inert gas, which is selected according to product properties.

16. The method of according to claim 8, wherein the sterile gas is compressed air or inert gas, which is selected according to product properties.

17. The method of according to claim 9, wherein the sterile gas is compressed air or inert gas, which is selected according to product properties.

18. The method of according to claim 10, wherein the sterile gas is compressed air or inert gas, which is selected according to product properties.

\* \* \* \* \*